UNITED STATES PATENT OFFICE.

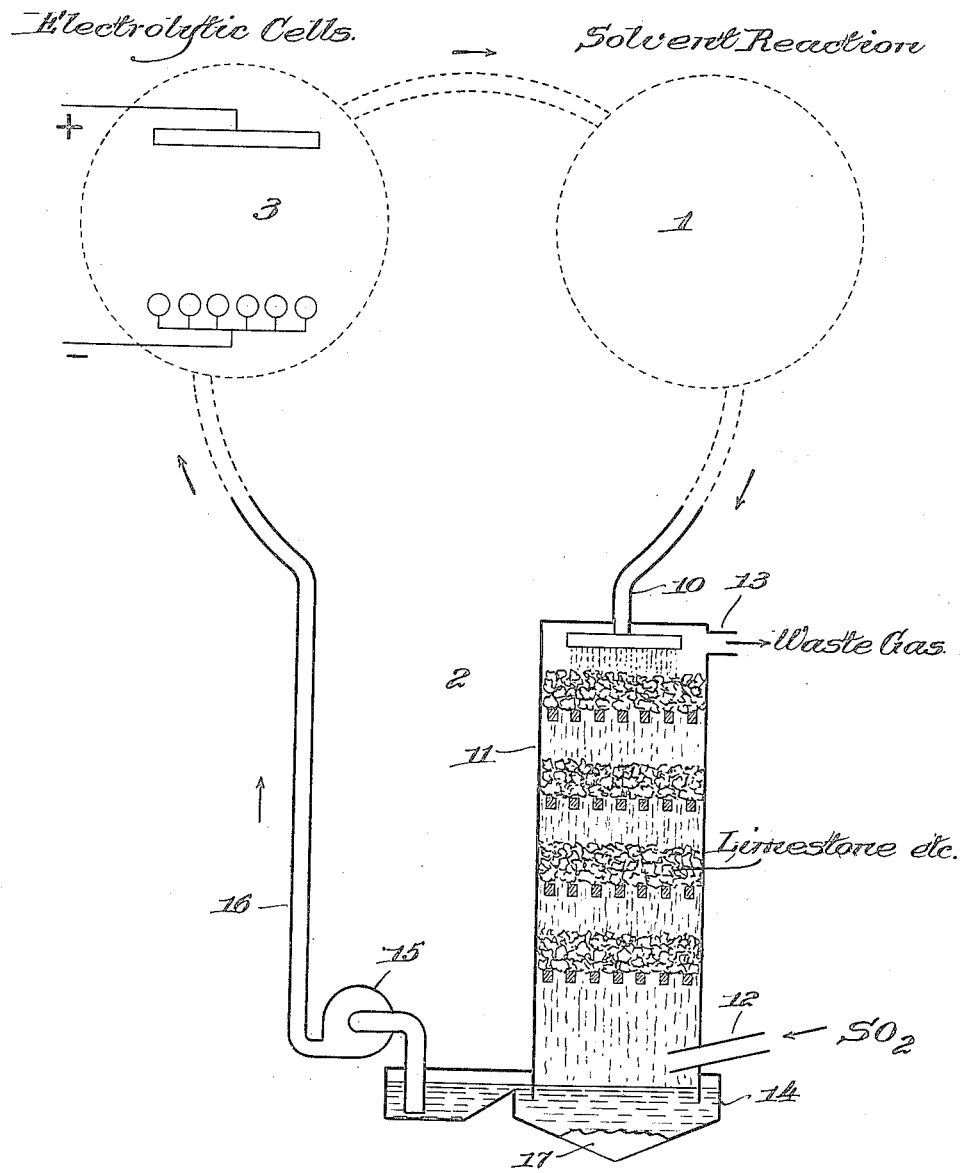

FREDERIC A. EUSTIS, OF MILTON, MASSACHUSETTS.

ART OF TREATING LIQUIDS USED IN INDUSTRIAL CHEMICAL PROCESSES.

1,397,094.     Specification of Letters Patent.     Patented Nov. 15, 1921.

Application filed November 3, 1919. Serial No. 335,453.

*To all whom it may concern:*

Be it known that I, FREDERIC A. EUSTIS, a citizen of the United States of America, and resident of Milton, in the county of Norfolk and State of Massachusetts, have invented new and useful Improvements in the Art of Treating Liquids Used in Industrial Chemical Processes, of which the following is a specification.

This invention relates to the art of treating liquids, particularly liquids serving as reagents, vehicles or electrolytes in industrial, metallurgical and chemical processes The invention provides a practicable way of including in the solution or liquid an agent for chemically reducing such liquid or solution. There are many processes of the commercial arts in which it is useful or desirable to reduce oxygen compounds carried by or constituting the liquids or solutions employed in the process. In the dye industry for instance, indigoes and other dye components must be reduced as an incident of the dyeing process; in electrochemical operations, and in many other wet chemical processes, it is desirable as a stage-treatment or in order to recover the values for which the solution is being treated to reduce the liquid vehicle or the electrolyte serving as the medium through which action upon the materials in solution is effected.

A paucity of suitable reducing agents is available for such purposes, especially of reducing agents capable of action in strongly acid solutions. Among the reducing agents of the prior art sulfur dioxid [$SO_2$] is well known, but its use has heretofore been attended with difficulty, amounting to a practical denial of its utility for the purposes mentioned. Inducing this gaseous material to enter in sufficient quantity into and remain in an active state in the solutions in which it might perform a reducing function heretofore, so far as I am aware, has not been accomplished.

As a commercial reagent sulfur dioxid has not been available until recently because of its cost and comparative rarity in commercial quantities. I have recently been enabled to produce sulfur dioxid in large quantities as a by-product of essential industries by a method, described in my Letters Patent of the United States, No. 1,212,199, dated January 16, 1917, of which the product is a physical solution in water of the sulfur dioxid made with the aid of the chemical or catalytic action of limestone or dolomite. Sulfur dioxid as a gas is readily obtainable either as a by-product from sources mentioned in said patent, or by combustion of sulfur.

By a series of experiments looking to the utilization of sulfur dioxid obtained by the patented process as a reducing agent in the chemical and metallurgical industries, I have found that the reducing action of sulfur dioxid alone, even when used in solutions in a high state of concentration, is very limited. This is particularly true of acid solutions.

I have discovered and shall herein describe a method of causing such solutions, including such acid solutions, to take up or absorb in an active state a large quantity of sulfur dioxid sufficient to act as a reducing agent even in the presence of much acidity; for instance, I have succeeded by the method to be described in securing complete reduction of an electrolytic solution containing as much as 6% of free sulfuric acid. It will be understood, however, that the specific instance of the art or method about to be described is selected for illustration only, and that the invention is concerned with a method of broad application for the reduction of liquid solutions, for which I am aware of many other useful applications in the industrial arts. For illustration only I shall describe the invention as applied to the continuous reduction of an electrolyte in a metallurgical process carried out by a solvent step in which the base metal of the ore is taken into solution by chemical combination with an acid, and from which solution the base metal is subsequently electro-deposited as a cathode deposit; and in which the electrolyte is then returned to take into combination more of the base metal.

In such a process oxygen is produced at the anode, which if not absorbed by the solution, mechanically removed, or otherwise dealt with, is destructive to the anode and active to diminish the efficiency of the electrolytic operation, especially to diminish the amount of metal recovered from the solution in reference to the amount of electrical energy supplied.

The mere application of a reducing agent, such as sulfur dioxid, to the electrolyte under such circumstances has little or no effect; the anodes are destroyed despite its presence and the current efficiency is not improved. I have discovered that a suspension, absorption or fixation in solution of the reducing agent [$SO_2$] is essential, and that when such absorption has been accomplished the continuous reduction of the electrolyte, even in the electrolytic cell where the oxidation normally takes place, may proceed along with the release in the solution of free acid and free oxygen by the electrolytic reaction.

Referring now to the accompanying drawing, the figure shows in diagram apparatus comprising an electrolytic cell, a solvent reaction vat, and apparatus for promoting absorption of a reducing agent in the solution, the apparatus being organized for the continuous circulation of the solution.

In many hydrometallurgical operations, typified by the use of such apparatus as is indicated in the diagram, it is a distinct advantage to be able to precipitate a metal to be recovered from a strongly acid electrolyte. For an instance it will be assumed that the process being carried out aims at the extraction of copper from oxid or carbonate ores, or calcines of sulfid ores. In this case the desired steps will comprise at the point 1 a solvent reaction by the passage of an acid (usually sulfuric acid) solution over the ore, the metal content being taken into the solution in the form of a sulfate of copper [or such other salt of the contained metal as may be found by experience to be best adapted to the subsequent recovery of the pure metal.]

The process also includes at the stage 3 use of an electrolytic cell for electro-deposition of metallic copper at the cathode pole of the cell, and the regeneration of free acid in the solution at the anode pole.

If a strongly acid electrolyte can be used, the rate of extracting metal from the ore may be increased at the point 1 in the process and the percentage of metal extracted from the ore may also be increased. A strongly acid solution permits a higher rate of deposit in reference to the current flow in the electrolytic cell, except for the effect of polarization in the electrolytic cell.

Unless the solution circulating between the solvent reaction vat 1 and the electrolytic cell 3 is treated in some manner, polarization in the electrolytic cell is an essential of the phenomena observed; current efficiency is decreased, and the anodes are destroyed. A compromise thus exists between the acid strength of the solution which promotes polarization, and the rate of the solvent reaction; solutions strong enough in acid properly to react at the solvent stage of the process are too strong in acid in respect to their behavior as an electrolyte In the practical operation of any such process it is necessary to remove at frequent intervals a portion of the solution in order to take out of the cycle constituting the process elements which tend to build up in the solution. In some cases acid is one of these elements; if the normal solution is highly acid the amount of the solution that must be removed daily because of the incidental addition of acid contents is proportionally lessened, since the acid contents added as an incident of treatment bears a fixed ratio to the amount of material treated, and the addition of so much acid to the whole amount of the solution is important inversely as it is a large or small part of the permitted contents of acid. In the specific case of the treatment of copper ores mentioned, and in many others, iron is one of the impurities tending to build up in the solution and which must be removed from it if the electrolysis of the copper salt is affected by its presence.

Because of the above considerations affecting electrolysis as complete a reduction and depolarization of the solution as possible should be obtained. The electrical efficiency and the nature of the metallic deposit both depend upon prompt reduction and continuous depolarization. The nature of the metallic deposit is affected unfavorably by polarization or high oxygenation of the solution and improved by depolarization or reduction. When depolarization is maintained, for instance, it is possible to work with an electrolyte carrying a higher percentage of iron than could be permitted in the solution without damage to its efficiency to recover the metal sought, e. g., copper, and the frequent removal of a portion of the solution to reduce the iron added to it as an incident of the process is made unnecessary.

The above considerations lead to the addition of another step to the cycle described above. As shown at 2 in the drawing, the electrolytic solution from the solvent reaction is caused by gravity or pumping to flow through a pipe 10 into the top of a tower 11 (or any other suitable reaction vessel of the scrubber or trommel type) having therein large surfaces of certain reactive substances. Solid salts of weak acids (e. g., carbonates) of calcium, potassium, sodium, magnesium, strontium, barium, zinc or copper (hereinafter referred to as alkaline earths or their equivalents) are suitable reactive substances. For a specific preferred instance, limestone or dolomite may be employed. This material is arranged as described in my said Patent No. 1,212,199, in broken masses in the apparatus 11, so as to present large broken surfaces to the acid solution trickling or flowing over it. These surfaces and the stream of liquid are in the path of a current of sulfur dioxid gas entering in opposition to the flow of liquid through a pipe 12, the waste gas, if any, flowing off through a pipe 13 at the top of the tower. The tower rests in a liquid-seal tank 14 from which the overflow reagent solution is removed by a pump 15 and delivered by a pipe 16 to the electrolytic cell or other reaction vat 3 as mentioned above. Solid precipitates are collected in and may be removed from the bottom portion 17 of the tank 14.

The effluent solution from the bottom of the tower 11 is now found to be in a state in which its contained sulfur dioxide behaves powerfully as a reducing agent. I do not at present know and therefore am unable to state precisely what the reactions are between the acid solutions delivered through the pipe 10, and the $SO_2$ gas in the presence of the weak-acid salt of a metal of the class referred to. The action partakes of catalysis; I have determined that some of the $SO_2$ reacting with the reagent substance, e. g., limestone, forms calcium sulfite, which acts in the film pouring over the limestone as a powerful reducing agent, changing to calcium sulfate; but the remainder of the $SO_2$, even when the electrolyte contains as much as 6% of free sulfuric acid, does not associate itself with the base, but remains in a state of free absorption or fixation in the electrolyte. This is made evident by experimental proof, consisting of the fact that during continuance of the operation described, the acidity of the electrolyte increases despite its continued reapplication to the limestone reagent. The increased acidity can be accounted for only by oxidation of the free sulfur dioxid in the electrolytic cells, the product being additional sulfuric acid. By "a state of fixation" I intend to refer to the observed condition in which the excess of chemically-unaltered $SO_2$ is taken in large quantities into and fixedly held in the liquid in a state of solution; or of division or suspension finer than a perceptibly globular, emulsified, or bubbly state, and partaking in its nature of actual and relatively permanent physical solution. I have not been able heretofore to attain by mixture, agitation or other mechanical means such a solution, division, suspension or inclusion of this gas in a liquid as that referred to and readily attained by the method, herein described, employing the aid of a catalytic or nascent-oxidation reaction step such as above mentioned. The best mechanical admixture known to me of $SO_2$ gas with liquids is relatively ineffective in respect to depolarization of an electrolytic cell and entrance of the $SO_2$ reagent into the reaction products of the electrolytic cell; such mechanical mixtures or partially-emulsified states of this gas in liquids employed as electrolytes characteristically give up a large proportion of their contained $SO_2$ as a free gas constantly after mixing, or upon heating, or during the reaction in the electrolytic cell. The electrolyte herein mentioned does not deliver up any substantial part of its free $SO_2$ either when stored for short times or from the cell 3 during electrolysis.

At stage 2 of the process as above described it is possible to vary the amounts of $SO_2$ which are respectively made into a sulfite, e. g., of calcium, and then converted to a sulfate, and the amounts taken into the solution as free fixed sulfur dioxid to be later converted into sulfuric acid in the electrolytic cell. These proportions depend upon the amount of the reagent, e. g., limestone, used in the treating tower 11, the proportionate amount of the entire solution poured over the reagent, and the rate of its passage over the reagent in the presence of the current of $SO_2$ gas. It is preferred and recommended that the solution be delivered at a rate to wash from the limestone by its mechanical action the film of calcium sulfate and impurities from the ore which otherwise tends to be formed, or that the lumps of the reagent alkaline earth substance be suitably agitated for the same purpose.

It will be understood without further explanation that the details of the process may be varied without departing from the invention. Instead of limestone or dolomite (carbonate of calcium and magnesium) other reagents or substances which will either introduce into the solution, or otherwise effect a reaction with and fixation of $SO_2$ by the presence of a weak-acid salt of a metal of the alkaline earths, may be used. These may be introduced in other ways than as above described into the solution; for instance by adding to the solution sodium hydroxid, or by adding to the solution sodium carbonate, in the presence of a current of free $SO_2$.

The absorption or fixation in the solution of free $SO_2$ under each of these circumstances I attribute to the reduction caused by the nascent calcium, sodium or other sulfites during their subsequent oxidization into sulfates.

The range of reagent materials generically includes other weak-acid salts of the metals of the group above mentioned. For instance, in addition to the carbonates, the phosphates, certain oxids, hydroxids, and the acetates and other organic compounds react in the manner described. Preference for limestone or dolomite is largely dictated by the cheapness, accessibility and mechanical structure of these materials.

While I have described for illustration only an electrolytic process for the recovery of copper, it will be understood that the step described of absorbing into or fixing in an acid solution a reducing addition of free sulfur dioxid is applicable without substantial change to other solutions for other purposes in which the presence of an active reducing agent is desirable.

I claim:

1. A liquid electrolyte for use in the electro-deposition of metals comprising a salt of the metal in an acid solution, and containing uncombined sulfur dioxid in a state of fixation in the liquid.

2. The art of treating liquids used in industrial chemical processes comprising as a step introducing sulfur dioxid into the liquid in a state of fixation.

3. The art of treating liquid vehicles for industrial chemical processes comprising as a step introducing into the liquid uncombined sulfur dioxid in a state of fixation with the aid of nascent sulfites of an appropriate metallic base or bases.

4. The art of making acid liquid electrolyte for industrial electro-chemical processes comprising as a step introducing into the liquid uncombined sulfur dioxid in a state of physical absorption with the aid of nascent sulfites of a metal of the alkaline earths.

5. The art of reducing liquids or solutions comprising the absorption into and fixation in the liquid or solution of uncombined or free sulfur dioxid gas by contact of the liquid, the sulfur dioxid gas, and an alkaline earth and thereafter subjecting the liquid to an oxygenizing reaction.

6. The art of making electrolytes comprising treating a base metal with an acid solution and the introduction into the electrolyte so formed of a carbonate of a metal of the alkaline earths in the presence of sulfur dioxid.

7. The art of treating acid electrolytes containing the acid salt of a metal to be recovered by electro-deposition comprising the formation in the electrolyte of a sulfite of a metal of the alkaline earths.

8. The art of treating acid electrolytes containing the acid salt of a metal to be recovered by electro-deposition comprising the introduction into the electrolyte of sulfite of calcium and of sulfur dioxid.

9. The art of treating electrolytes comprising bringing the electrolyte successively into intimate contact with a source of a base metal to be recovered by electro-deposition and sulfur dioxid gas and an alkaline earth sulfite.

10. The art of treating acid electrolytes containing the acid salt of a metal to be recovered by electro-deposition comprising bringing the electrolyte into intimate contact with sulfur dioxid gas and an alkaline earth.

11. The art of treating electrolytes containing the acid salt of a metal to be recovered by electro - deposition comprising the continuous introduction into the electrolyte while in the presence of a weak-acid salt of a metal of the alkaline earths of a stream of sulfur dioxid gas.

12. The art of treating electrolytes comprising the absorption into the electrolyte of the depolarizing agent formed by passing the electrolyte over a weak-acid salt of one of the metals of the alkaline earths in the presence of sulfur dioxid gas and thereafter electrolyzing the electrolyte.

13. The art of treating electrolytes comprising the absorption into the electrolyte of the depolarizing agent formed by passing the electrolyte over a weak-acid salt of one of the metals of the alkaline earths in the presence of sulfuric acid and sulfur dioxid gas.

14. The art of recovering metals from their ores comprising the following steps: leaching the ore with an acid solution, fixing in the acid solution free sulfur dioxid with the aid of a weak-acid salt of a metal of the alkaline earths, and recovering the metal from the solution by electrolysis while the solution remains in a depolarizing state due to the fixation therein of sulfur dioxid.

15. The art of continuously reducing electrolytes comprising circulation of the electrolyte in contact with an alkaline earth in the presence of an opposing stream of sulfur dioxid.

16. The art of electrolytic recovery of the bases of salts formed by solvent reactions of an electrolyte comprising as a step the introduction into the electrolyte of a reducing and depolarizing agent by fixation in the electrolyte of free sulfur dioxid.

17. The art of reducing electrolytes comprising circulation of the electrolyte through the electrolytic cell and through a reaction vessel containing calcium carbonate, while maintaining in said vessel a flow, in opposition to the stream of electrolyte, of sulfur dioxid gas.

18. The art of treating electrolytes for continuous depolarization and protection of the anode substance of the electrolytic cell comprising the introduction into the electrolyte prior to electrolysis of sulfur dioxid in a state of fixation.

19. The art of simultaneously reducing and rendering depolarizing an electrolyte comprising treatment of the electrolyte during circulation through an electrolytic cell to cause fixation therein of uncombined sulfur dioxid.

20. The art of electrolytic recovery of metals comprising the continuous circulation of an acid solution through a reaction vat in contact with the ore, through a reaction vessel in contact with a weak-acid salt of a metal of the alkaline earths and with a stream of sulfur dioxid gas, through an electrolytic cell, and thence to the reaction vat.

Signed by me at Boston, Massachusetts, this 31st day of October, 1919.

FREDERIC A. EUSTIS.